Patented Aug. 22, 1950

2,519,412

UNITED STATES PATENT OFFICE 2,519,412

PROCESS FOR SEPARATING BASIC ORGANIC COMPOUNDS

Wojciech Swietoslawski, Pittsburgh, Pa., assignor, by mesne assignments, to Koppers Company, Inc., Pittsburgh, Pa., a corporation of Delaware Application September 30, 1944, Serial No. 556,598

13 Claims. (Cl. 260—290)

This invention relates to the separation and the purification of basic organic compounds. More particularly the invention relates to the separation of organic bases by substitution or by distillation of the salts of the bases which are formed with a strong acid.

I have found that the basicity of basic reacting compounds is more distinctly pronounced if they react as free bases, without the use of a solvent or in a non-aqueous solution. They may be separated selectively by reaction with a strong acid or a salt of the weakest base present in the mixture. The acid reacts first with the strongest base to form a salt which is precipitated since it is usually less soluble in the mixture of free bases. It is essential to mix the reacting substances at a temperature which is high enough to have a one-phase liquid system. After cooling the salt of the strongest base is precipitated and may be removed by filtration. Afterward a new portion of the acid or of the salt of the weakest base is added in the quantity required to precipitate the salt of the second base which is weaker than the first but stronger than the remaining bases. A small amount of the stronger base is present in the precipitate because when the first precipitate is formed, the mixture is saturated with that salt. This process is continued until all the basic compounds are separated and the mother liquor contains the weakest base with some amounts of salts of stronger bases, according to their solubilities in that base. Below this method of separation is called the substitution method of separation.

I have also found that some of the volatile acid salts of organic bases have comparatively widely separated boiling points and these salts may be separated by fractional distillation because the salts melt and vaporize without substantial decomposition.

An important source of basic compounds are the tars obtained by the carbonization of coal in coke ovens. For example, a product commonly known as 3° tar base is a fraction separated by distillation from the coal tars, which is made up mainly of 3-picoline, 4-picoline and 2,6-lutidine. These compounds have the following boiling points at 738.0 mm. pressure at 25° C.: 3-picoline 143.1° C., 4-picoline 144.0° C., 2,6-lutidine 143.2° C. The mixture of bases ordinarily cannot be separated in the most efficient type of fractional distillation equipment. The present invention, however, is very effective in making a separation of these compounds. In making the separation the 2,6-lutidine is preferably separated by substitution and the 3- and 4-picolines are then transformed into salts and separated by distillation.

The primary object of the present invention is to provide a process of separating a mixture of basic reacting compounds by the selective substitution and precipitation of the compounds in the mixture with a salt, the basic compounds being separated in succession from the strongest to the weakest basic compound.

In accordance with this object one feature of the invention consists in the formation of a strong-acid salt with the weakest base of the mixture and adding to the mixture a proportion equimolecular to the amount of the strongest basic compound and reacting the acid of the salt of the weakest base to form a salt of the strongest base which may be precipitated and separated from the mixture. Each of the basic compounds is separated in succession from the mixture by this means.

The volatile salts of the organic basic materials may ordinarily be separated by fractional distillation. With some mixtures, however, it has been found that the boiling point of the salt may be very close to the decomposition temperature of the salt. Therefore it is best to separate such a salt from the mixture by substitution and then separate the remaining basic compounds by forming the salts and fractionally distilling the salts to separate them.

Accordingly another object of the invention is to provide a process of separating organic basic materials by the fractional distillation of volatile salts formed by the bases.

In the ordinary substitution process of separating the organic basic compounds the purity of the compounds separated varies from 65 percent to 95 percent. It has been found that these partially purified compounds may undergo further purification by a procedure which consists in precipitating the pure salt of a base from a mixture of its impure salt with impure free base, with or without using a solvent. This procedure may be applied in all cases in which the concentration of impurities (other bases) was made, by treatment previously described, low enough in order not to be found in the precipitate. This purified salt may then be treated with strong hydroxide to form the pure base.

In using this method of purification the impurity content should be kept lower than the concentration found in the binary eutectic of any contamination present in the mixture. Thus, the substitution method and the distillation of salts should be used in such a manner as to reach the degree of purity of the base high enough to make the further purification as previously described fully effective.

In the present invention the basic compounds and their salts are preferably used in their anhydrous form so as to have more favorable conditions for carrying out the precipitation or the distillation of the salts. Gaseous hydrogen chloride may be used for forming the salts of tar bases in the anhydrous form. However, concentrated hydrochloric acid (hydrous form) may be used in forming the salts of the tar bases. For this reaction a special distillation apparatus is employed and the amount of hydrochloric acid used is such that a hydrochloric acid-water azeotrope is formed containing about 80 percent water and 20 percent HCl that can be distilled overhead to be separated from the salts.

Therefore another object of the invention is to provide a process of forming salts of tar bases when using hydrous or anhydrous conditions.

The separated salts of the tar bases are preferably converted to the bases by treatment with ammonium hydroxide. Anhydrous ammonia may be used, but ammonium hydroxide may be advantageously used and the water may be removed from the tar bases by azeotropic distillation with benzene as azeotropic agent.

A further object of the invention is to provide a process of converting salts of tar bases to the free tar bases by the use of inorganic hydroxides while avoiding loss due to foaming in the neutralization of the salts.

With these and other features and objects in view the invention consists in the process of separating basic organic materials hereinafter described and particularly defined in the claims.

The various features of the invention are illustrated in the accompanying drawings which are:

The description of the process for separating organic bases is directed particularly to the separation of a (three-degree) 3° tar base distillate.

Figure 1:
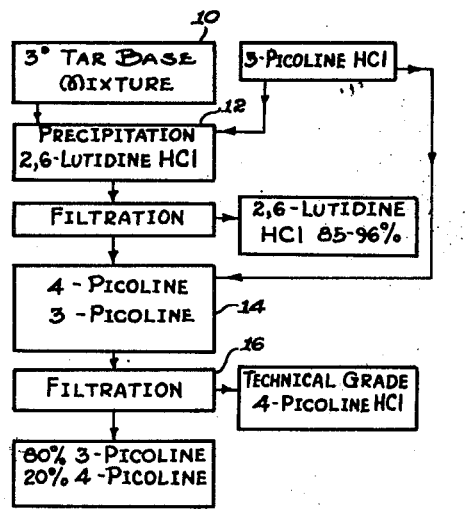
Figure 1 is a diagrammatic flow sheet showing the various process steps used in the process of separation of a 3° tar base by the substitution method.

Referring specifically to Figure 1, the flow sheet shows the separation of the tar base by the substitution method. To accomplish this the liquid tar base from container 10 is treated in precipitating tank 12 with melted 3-picoline hydrochloride. The amount of 3-picoline hydrochloride added is preferably slightly in excess of the equimolecular proportion of 2,6-lutidine in the 3° base mixture. The temperature of the mixture is maintained sufficiently high so that the hydrochloride will be completely dissolved in the base. This solution of base and hydrochloride is agitated in the container 12 and allowed to stand until the crystallization of 2,6-lutidine is completed, then the 2,6-lutidine hydrochloride is separated by filtration.

The mixture of the 3-picoline and 4-picoline base remaining after filtration is then treated with 3-picoline hydrochloride in mixing chamber 14, the amount being slightly in excess of an equimolecular proportion of the 4-picoline base in the mixture and, after standing, 4-picoline hydrochloride is precipitated. This precipitate is then passed through filter 16 and technical grade 4-picoline hydrochloride is collected. This 4-picoline salt is sufficiently pure for some purposes (60%–95%) or may be further purified. The solution remaining in the filtrate is a mixture of approximately 80 percent 3-picoline and 20 percent 4-picoline. 3-picoline base may be removed from this mixture by freezing to separate substantially pure 3-picoline. The mother liquor having a composition near to that of the binary 3-picoline-4-picoline eutectic may be returned to the cycle for treatment as previously described and shown in Figure 1.

In carrying out the substitution method it is often very advantageous to use a solvent to facilitate the precipitation, the crystallization and the filtration of a component being separated. For example in the separation of the 3° tar base mixture, 3-picoline is a good solvent. In this mixture also dimethyl aniline may be used. A good qualification of such a solvent is that it is a base not stronger in basicity than the weakest base in the mixture. Solvents other than weak basic materials may be used, but it is important that the solvent shall dissolve the precipitate at the higher temperatures and permit the precipitation of the precipitate at the lower temperatures. 4-picoline may be used as a solvent in the separation of 4-picoline and 2,6-lutidine.

To illustrate the application of the substitution method the following example is given: 13.6 grams of a mixture containing 12.2 grams of 3-picoline hydrochloride and 1.4 grams of 4-picoline were mixed with 100 grams of 3° tar base fraction. The mixture was heated to dissolve the hydrochlorides in the tar base fraction. Then the mixture was cooled and the 2,6-lutidine hydrochloride crystals appeared at a temperature approaching 20° C. This precipitate was removed at 20° C. and had a melting temperature of 225.2° C. This melting point indicates a 95 percent concentration of 2,6-lutidine. The mixture was then heated and recooled twice to remove additional 2,6-lutidine hydrochloric crystals. Any further precipitation tended to precipitate 4-picoline hydrochloride. Thereupon 10.2 grams of a mixture of 3-picoline hydrochloride and 4-picoline hydrochloride were added to the mixture and after being melted it was cooled to a temperature of approximately 20° C. and a salt corresponding to 90 percent 4-picoline hydrochloride was recovered. After several repeated precipitations and separations of 4-picoline hydrochloride, a point was reached at which the composition of the precipitate was the same as the composition of the precipitant, indicating that an equilibrium had been reached. The composition of the remaining mixture of tar bases was approximately 80 percent 3-picoline and 20 percent 4-picoline with a minute quantity of 2,6-lutidine. This mixture can be further treated to separate pure 3-picoline by the method described above.

Figure 3:
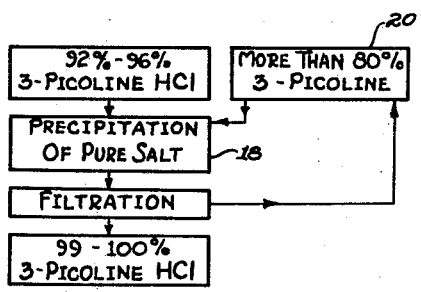
Figure 3 is a diagrammatic flow sheet illustrating the steps required in the treatment of 3-picoline hydrochloride to obtain a substantially pure 3-picoline hydrochloride.

As it is shown in the case of the 3° tar base mixture only 2,6-lutidine may be obtained in a substantially pure state. To avoid the freezing and recycling of the mixture of 3- and 4-picoline bases they may be transformed into hydrochlorides and separated by fractional distillation. Afterward the further purification of the hydrochlorides may be carried out as illustrated in Figures 3 and 4.

Referring to Figure 3, 92–96% 3-picoline hydrochloride, which may be easily obtained as the top product of distillation, is mixed in reaction chamber 18 with 3-picoline base which should contain more than 80 percent of that base. The latter is drawn from container 20. This mixture is thoroughly stirred and allowed to react whereby the hydrochloride impurities accompanying the 3-picoline hydrochloride are replaced by the 3-picoline base, that is the 3-picoline base unites with the HCl radical of the impurities so that all of the HCl radical of the impurities is taken up to form 3-picoline hydrochloride. Pure 3-picoline hydrochloride is then precipitated from the mixture at an appropriate temperature which may vary from 20 to 0° C. The impure 3-picoline base containing the separated bases of the impurities constitutes the mother liquor and may be returned to chamber 20 for reuse. The impure mixture would be used repeatedly until the amount of impurity contained in the free base mixture is such that a comparatively pure 3-picoline hydrochloride will not be precipitated.

Figure 4:
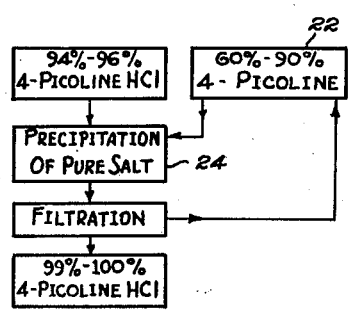
Figure 4 is a diagrammatic flow sheet illustrating the steps required in the purification of the hydrochloride of 4-picoline to get a substantially pure 4-picoline hydrochloride.

The same type of purification reaction is illustrated in Figure 4 as applied to an impure 4-picoline hydrochloride which is treated with an impure free base 4-picoline material contained in chamber 22 which should contain more than 60% of 4-picoline base. This impure base is mixed with the 4-picoline hydrochloride in precipitating chamber 24. The impurity associated with the 4-picoline hydrochloride is replaced by free base wherein the 4-picoline base unites with the HCl radical of the impurities to form 4-picoline hydrochloride. The purified 4-picoline hydrochloride is precipitated and filtered. When 4-picoline base in chamber 22 becomes contaminated with impurities so that the 4-picoline base content is less than 60% it must be discarded and replaced with 4-picoline base material containing 60% or more of 4-picoline base.

This same type of reaction may be utilized in forming a purified 2,6-lutidine hydrochloride. It has been found, however, that 2,6-lutidine hydrochloride may be separated from the mixture of tar base by the use of 3-picoline hydrochloride in such a purified state that often it is not necessary to treat the 2,6-lutidine hydrochloride to obtain a high degree of purification.

Figure 5:
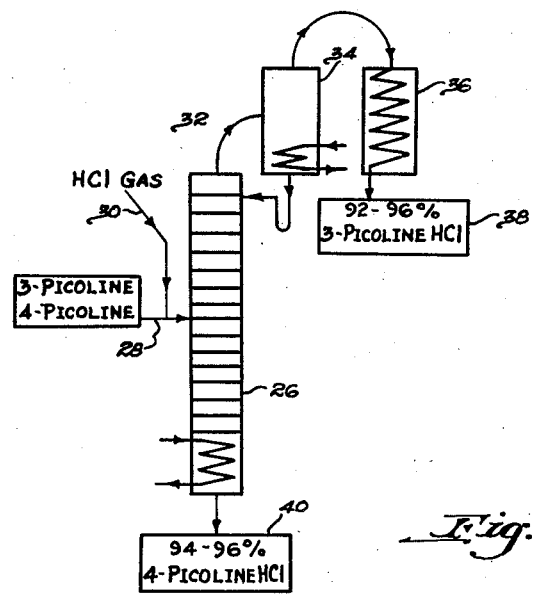
Figure 5 is a diagrammatic flow sheet of an apparatus illustrating the process steps used in the conversion of a mixture of 3-picoline and 4-picoline to the hydrochlorides of these bases by the action of anhydrous hydrogen chloride and their separation by fractional distillation.

Above has been described a process for the precipitation of tar base hydrochlorides by means of selective substitution or treatment of the bases with a hydrochloride of a weaker base. For the transformation of free bases into hydrochlorides for the fractional distillation of hydrochlorides two procedures may be used. One, shown in Figure 5, consists in feeding to a distilling column a mixture of free bases and dry gaseous hydrogen chloride; the other, shown in Figure 6, makes it possible to employ a concentrated aqueous solution of hydrochloric acid. In Figure 5 the mixture of 3-picoline and 4-picoline base, remaining after the precipitation of 2,6-lutidine hydrochloride, is introduced into column 26 through line 28 and reacts with hydrogen chloride introduced through line 30 to form the hydrochlorides. The more volatile 3-picoline hydrochloride is removed from the top of the column through a line 32 and dephlegmator 34 to a condenser 36 and receiver 38. The less volatile 4-picoline hydrochloride is removed from the bottom of the distilling column into receiver 40.

Figure 6:
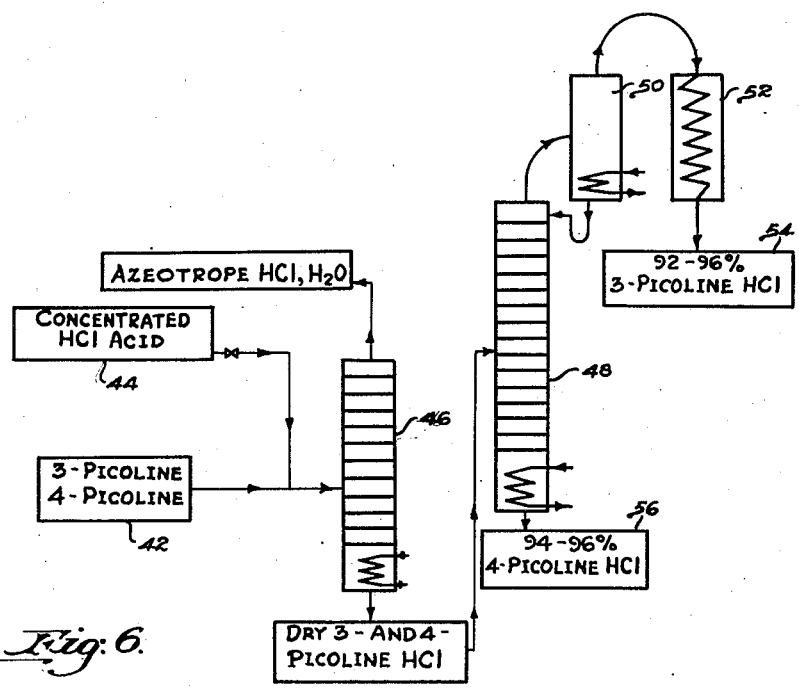
Figure 6 is a diagrammatic flow sheet of an apparatus illustrating the process of converting a mixture of 3- and 4-picolines into the hydrochlorides by using concentrated hydrochloric acid, and the process of separating these salts by fractional distillation.

If concentrated hydrochloric acid is used in place of hydrogen chloride, the dehydration of the hydrochlorides of 3-picoline and 4-picoline should precede fractional distillation. In Figure 6 the operation is schematically shown. A mixture of 3-picoline and 4-picoline from a container 42 is mixed with an excess of concentrated hydrochloric acid from a container 44 and is fed into column 46. The amount of hydrochloric acid should be large enough to neutralize the tar bases and to form an azeotrope with water found in the solution. The boiling temperature of the azeotrope is 120° C. lower than the average boiling temperature of the mixture of hydrochlorides which is approximately 238° C. for a mixture containing 50 percent of each of the components. Because of this large difference in boiling temperatures the azeotrope can be removed easily at the top of column 46. The bottom product is the mixture of the dry hydrochlorides. This mixture is fed to the mid portion of a distilling column 48 before reaching the temperature of its solidification. As the result of fractional distillation 92–96% 3-picoline hydrochloride passes overhead through a dephlegmator 50 and condenser 52 to a receiver 54, and 94–96% 4-picoline hydrochloride passes out of the bottom of the column to receiver 56.

Experiments have proven that the top products contain 92–96% 3-picoline hydrochloride and the bottom product 94–96% pure 4-picoline hydrochloride. Both these products may undergo further purification as described previously and illustrated in Figures 3 and 4.

To illustrate how effective is the separation of 3- and 4-picoline hydrochlorides by fractional distillation the following example is given:

1731 grams of a mixture of 3- and 4-picoline hydrochlorides were submitted to fractional distillation in a column having thirty to thirty-five theoretical plates. The following fractions were collected:

| Fraction | Weight, Grams | Temperature Range Degrees C. | Percent of Total Wt. | Percent of 3-picoline |
|---|---|---|---|---|
| Forerunnings | 58.6 | up to 234 | 3.4 | 70 |
| I | 475.7 | 234– 235.2 | 27.4 | 90 |
| II | 140.4 | 235.2–240.4 | 8.1 | 50 |
| III | 100.7 | 240.4–243.0 | 5.8 | 10 |
| IV | 145.3 | above 243.0 | 8.4 | |
| Residue and Hold-up | 810.3 | | 46.7 | |
| | 1,731.0 | | 99.8 | |

465.4 grams of the fraction boiling in the temperature range of 234° C. to 235.2° were redistilled in the column using a Beckmann calibrated thermometer so as to be able to notice the changes in the condensation temperature with an accuracy of ±.002° C. Two main fractions were collected; one with a purity of 93 percent, and the other with a 96 percent 3-picoline hydrochloride. Each of the fractions contained a small excess of hydrogen chloride. The difference in boiling temperature at which the fractions were collected was 0.14° C.

Figure 2:
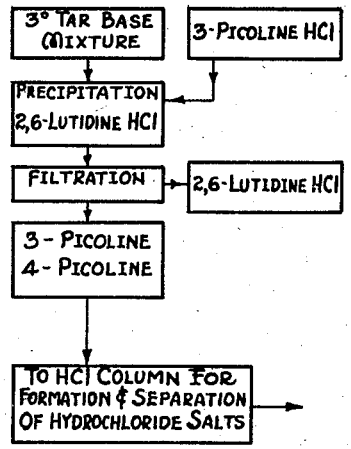
Figure 2 is a diagrammatic flow sheet illustrating the separation of 2,6-lutidine from the 3° tar base mixture for obtaining a mixture of 3- and 4-picoline which may be fed to a distilling column for the formation and separation of their hydrochlorides.

The 3° tar base may be separated into its components by combined operations as illustrated in Figures 2 and 5. 3° tar base mixture is treated as shown in Figure 2 with an adequate amount of 92-96% 3-picoline hydrochloride which is the product in receiver 38, Figure 5, or in receiver 54, Figure 6, as obtained in the distilling column. 2,6-lutidine hydrochloride is precipitated and separated by filtration. The mother liquor filtrate is fed to column 26, Figure 5. On the same level dry hydrogen chloride is introduced. Since 3-picoline hydrochloride boils at 234.0° C. or about 8.4° lower than 4-picoline hydrochloride which boils at 242.4° C., this difference is great enough for separating these hydrochlorides by distillation. As the top product freezes at about 80° C. the condenser 36 is filled with hot water. Bottom product 40 consists of 94-96% 4-picoline hydrochloride. As stated previously, the separation of 3- and 4-picoline may also be carried out according to the process illustrated in Figure 6.

Figure 7:
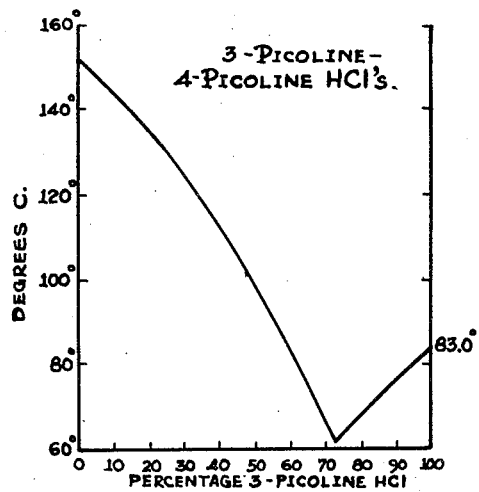
Figure 7 is the cooling curve of a mixture of 3-picoline and 4-picoline hydrochlorides and illustrates the eutectic point of the mixture.

The purification of the tar base hydrochlorides may be carried out by freezing and crystallizing one of the components until the eutectic point is reached. In Figure 7 is illustrated the cooling curve of a mixture of 3- and 4-picoline hydrochlorides. This mixture preferably is made up of a predominant proportion of 3-picoline hydrochloride. As the mixture is cooled the 3-picoline hydrochloride tends to precipitate as pure 3-picoline hydrochloride. This separation of pure 3-picoline hydrochloride will continue until the eutectic point is reached which is illustrated in Figure 7 as a mixture of approximately 72% 3-picoline hydrochloride and 28% 4-picoline hydrochloride. The remaining eutectic mixture may be added to new mixtures of 3- and 4-picoline hydrochlorides for fractional distillation which leads to enriched 3-picoline hydrochloride as top product and 4-picoline hydrochloride as bottom product.

Figure 8:
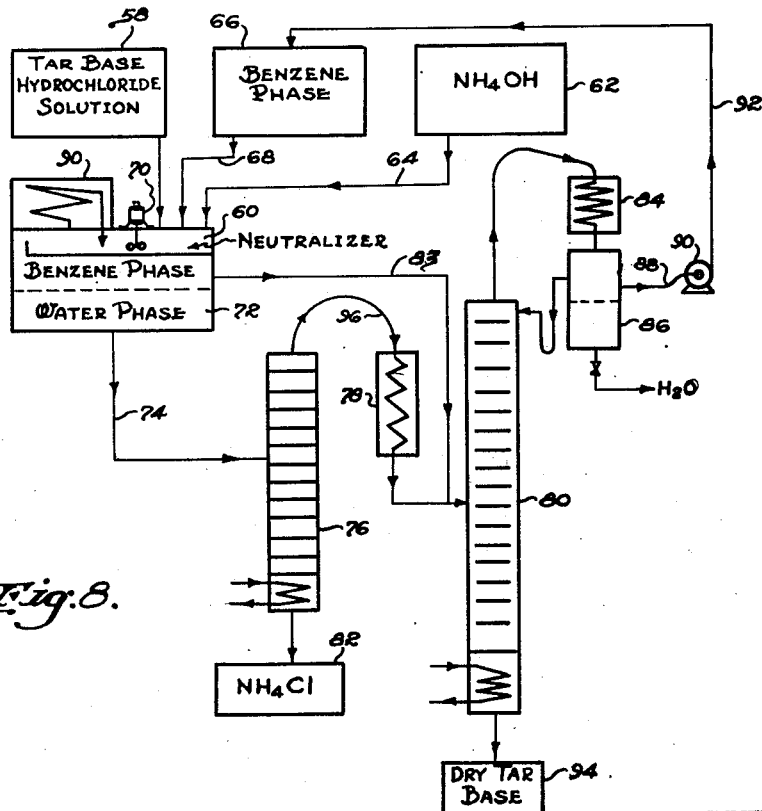
Figure 8 is a diagrammatic flow sheet illustrating the apparatus by which hydrochlorides of the organic bases may be converted to the free tar bases.

According to my invention the separation of the constituents of the 3° tar base fraction requires a partial or complete transformation of the bases into their hydrochlorides. The recovery and dehydration of free bases from the hydrochlorides plays an essential part in the operation. In Figure 8 is illustrated an apparatus in which the conversion of the hydrochlorides to the pure base may be carried out.

Referring to the drawing a concentrated aqueous solution of the tar base hydrochloride is drawn from a container 58 into a neutralizer 60. To the tar base hydrochloride is added ammonia which is drawn from a container 62 through a line 64 and at the same time benzene is drawn from a container 66 and passed through a line 68 into the neutralizer. The mixture in the neutralizer is thoroughly stirred by a stirrer 70 and overflows into a settling chamber 72. In the settling chamber the mixture of tar base, benzene, water and ammonium chloride separates into two phases, a benzene phase containing the tar base and a water phase containing ammonium chloride. The water phase is drawn off through a line 74 into the mid portion of a distilling column 76. A substantially uniform temperature is maintained at the bottom of the column 76 so that a water-tar base azeotrope distills overhead into a condenser 78. The mixture of tar base and water passes from the condenser 78 into the mid portion of a distilling column 80. Ammonium chloride is removed from the base of the column 76, in a concentrated hot solution. Sufficient water is maintained in the system so that the ammonium chloride will not crystallize in the still 76 but will crystallize when released into a container 82. To the condensate from the condenser 78 is added the benzene tar base phase from the neutralizer 60. This benzene phase flows through a line 63 into the mid portion of the column 80. At the top of column 80 a substantially uniform temperature of distillation is maintained so that a benzene-water azeotrope is carried overhead through a condenser 84 into a separating chamber. Water is drawn off from the base of the separator 86 and the benzene containing some tar is drawn off through a line 88 to a pump 90 and forced through a line 92 back into the benzene container 66. In the column 80 benzene and water are separated from the tar base so that a dry tar base is drawn off from the base of the column into receiver 94.

In the separation of the tar bases by the distillation of the tar base hydrochlorides, it is important to have excess acid present to minimize the decomposition of the hydrochlorides. The presence of the acid gives a corrosion problem and therefore it is desirable to reduce the temperature of distillation as low as possible. To accomplish this a modification of the operation previously described may be carried out. This modification consists in limiting the amount of HCl, or the amount of tar base hydrochloride, used in the formation of the hydrochlorides so as to leave in the 3° tar base mixture free 3-picoline base. This 3-picoline base has a much lower boiling point than the boiling points of the 4-picoline and 2,6-lutidine hydrochlorides so that, upon distillation, the 3-picoline base may be readily separated overhead.

In the separation of the tar bases and tar base hydrochlorides, it is important that the distillation and refining of the hydrochlorides should be carried out in the absence of water because water changes the freezing curves of the picoline.

The above discussion shows the application of the invention to the separation of a 3° tar base. The process of this invention, however, is not limited to the separation of 3° tar bases but has application to other basic reacting organic compounds, such as, for example, aniline and its derivatives. The process can be used effectively for the separation of aniline from methyl aniline and dimethyl aniline. These compounds can be changed into the hydrochlorides by treatment of the bases with hydrochloric acid and the salts may be separated by substitution and distillation in the same way as described above with reference to the 3° tar bases. If distillation of those amines is carried out the operation should be carried out rapidly so as to avoid the known side reactions.

The process has application furthermore with reference to the separation of other organic amines which have closely related boiling points.

The preferred form of the invention having been thus described what is claimed as new is:

1. A process of separating an individual organic nitrogen base from a mixture of bases consisting of 3-picoline, 4-picoline, and 2,6-lutidine by substitution which comprises: reducing the mixture of bases to an anhydrous form, adding to the mixture a sufficient amount of an anhydrous salt of one of said picoline bases to substitute its acid radical in the 2,6-lutidine base and maintaining the mixture at a temperature at which the salt will be dissolved in the mixture for a sufficient period of time to permit the acid radical substitution, then cooling the mixture to precipitate the salt of 2,6-lutidine and removing the precipitated salt from the solution.

2. The process as defined in claim 1 in which the three basic pyridine compounds are separated from one another one at a time from a mixture in the order of from the strongest to weakest of said bases.

3. The process defined in claim 1 in which the anhydrous salt used is a hydrochloride of the pyridine.

4. The process defined in claim 1 in which the precipitation and separation of the salt of one base is carried out at a temperature above the eutectic temperature of the salt to be purified and the salt constituting the impurity.

5. The process defined in claim 1 in which 2,6-lutidine is separated by substitution from a mixture of the pyridines the remaining picolines are converted to the hydrochloride salts by substitution and then fractionally distilled to separate the 3-picoline hydrochloride from the 4-picoline hydrochloride.

6. A process of separating an individual organic nitrogen base from a mixture of two of the pyridine bases consisting of the group 3-picoline, 4-picoline and 2,6-lutidine by substitution which comprises: reducing the mixture of bases to an anhydrous form, adding to the mixture of bases a sufficient amount of an anhydrous hydrochloride salt of the weakest base of the mixture to substitute its acid radical in the strongest base, maintaining the mixture at a temperature at which the salt will be dissolved for a sufficient period of time to permit the acid radical substitution, cooling the mixture to precipitate the strongest base hydrochloride, separating the hydrochloride salt from the solution, treating the hydrochloride salt with ammonium hydroxide in the presence of benzene to produce a water-phase and a benzene-phase, distilling the water-phase to separate ammonium chloride from a water-benzene azeotrope, then distilling the benzene-phase together with the benzene-water azeotrope to separate benzene from the desired base and from water.

7. The process as defined in claim 6 in which the amount of water in the ammonium hydroxide used in the conversion of the hydrochloride salt to the nitrogen base is that amount which is required to hold the ammonium chloride to a concentration at which it will not precipitate during distillation of the water-phase to permit the base to pass overhead.

8. A process of producing an organic nitrogen base of high purity of the group of bases consisting of 3-picoline, 4-picoline and 2,6-lutidine when the base being purified contains a small amount of another base of the said group having a weaker basicity comprising: treating the impure base of said group with an amount of anhydrous hydrochloric acid slightly less than that required to neutralize the desired base, then cooling the solution to precipitate the hydrochloride salt of the pure base, removing the precipitate and neutralizing the acid salt with an alkali to form the pure desired base.

9. The process defined in claim 8 in which the hydrochloric acid is supplied in the form of the hydrochloride salt of the base undergoing purification and the mixture before cooling is heated to a temperature at which the salt is entirely dissolved in the base.

10. A process of producing an organic nitrogen base of high purity of the group consisting of 3-picoline, 4-picoline and 2,6-lutidine when such base is associated with a small amount of a more basic pyridine of the said group having closely related physical and chemical properties, comprising: treating the impure base to form an anhydrous state, adding an acid to form salts of the bases in the mixture, adding to the salt mixture a partially purified base of the same composition as the base being purified, heating the mixture to bring the salt and base into solution to cause the added base to unite with the acid radical of the impurity salt of the strongest base in the mixture, cooling the heated mixture to a temperature which will precipitate the acid salt to be purified, filtering to separate the precipitated salt and treating the precipitated salt with an alkali to recover a purified base.

11. A process of separating a 2,6-lutidine base of high purity from a base mixture consisting of 3-picoline, 4-picoline and 2,6-lutidine, comprising: reducing the base group to the anhydrous state, treating the anhydrous mixture with a hydrochloric acid salt of a picoline of said group, heating the mixture to dissolve the added salt in the base to be purified and holding the mixture in heated solution for sufficient time to permit the acid radical of the added salt to be substituted to form 2,6-lutidine hydrochloride, cooling the heated mixture to precipitate the 2,6-lutidine hydrochloride, filtering to separate the 2,6-lutidine hydrochloride, adding to the precipitated salt a partially purified 2,6-lutidine having a purity greater than 60% 2,6-lutidine, heating the mixture to cause a union of the 2,6-lutidine with a hydrochloric radical of any base salt associated with the 2,6-lutidine hydrochloride, cooling the mixture to precipitate substantially pure 2,6-lutidine hydrochloride, separating the 2,6-lutidine hydrochloride by filtration and treating the precipitated 2,6-lutidine with ammonia to form pure 2,6-lutidine.

12. The process as defined in claim 11 in which any one of the three pyridine bases is separated from the other bases and purified one at a time in the order of from the strongest to the weakest of said bases.

13. In a process of refining a 3° tar base mixture consisting of 2,6-lutidine, 4-picoline and 3-picoline, the step of forming anhydrous salts of the bases comprising: passing the mixture of bases through a distilling column in admixture with an aqueous solution of hydrochloric acid, controlling the amount of acid added to form salts of the bases and an acid-water azeotrope of all water present in the solution, and distilling to take overhead the hydrochloric acid-water azeotrope while recovering the salts in anhydrous form as a residue of the distillation.

WOJCIECH SWIETOSLAWSKI.

(References on following page)

REFERENCES CITED

The following references are of record in the file of this patent:

UNITED STATES PATENTS

| Number | Name | Date |
|---|---|---|
| 1,274,998 | Dodge | Aug. 6, 1918 |
| 1,274,999 | Dodge | Aug. 6, 1918 |
| 1,290,124 | Downs | Jan. 7, 1919 |
| 1,686,136 | Ihrig | Oct. 2, 1928 |
| 1,965,828 | Fox | July 10, 1934 |
| 2,035,583 | Bailey | Mar. 31, 1936 |
| 2,136,604 | Bailey | Nov. 15, 1938 |
| 2,222,993 | Toennies | Nov. 26, 1940 |
| 2,288,281 | Huijser et al. | June 30, 1941 |
| 2,264,759 | Jones | Dec. 2, 1941 |
| 2,320,322 | Cislak | May 25, 1943 |
| 2,336,502 | Reimers | Dec. 14, 1943 |
| 2,350,447 | Cole | June 6, 1944 |

OTHER REFERENCES

Lunge: "The Manufacture of Sulfuric Acid and Alkali," 3rd ed., vol. II, part 1, pp. 36–38 (Gurney and Jackson; London, 1909).

Blanchard et al.: "Synthetic Inorganic Chemistry," 4th ed., page 76 (John Wiley; New York; 1930).

Journal Chem. Soc. (London) 1940, pp. 241–243.